United States Patent
Alonzo et al.

(10) Patent No.: US 10,065,611 B1
(45) Date of Patent: Sep. 4, 2018

(54) WINDSHIELD CLEANING IMPLEMENT

(71) Applicants: Reynaldo V Alonzo, Fresno, CA (US); Nina Seyedabadi, Fresno, CA (US)

(72) Inventors: Reynaldo V Alonzo, Fresno, CA (US); Nina Seyedabadi, Fresno, CA (US)

( * ) Notice: Subject to any disclaimer, the term of this patent is extended or adjusted under 35 U.S.C. 154(b) by 0 days.

(21) Appl. No.: 14/829,048

(22) Filed: Aug. 18, 2015

Related U.S. Application Data

(60) Provisional application No. 62/043,003, filed on Aug. 28, 2014.

(51) Int. Cl.
| | |
|---|---|
| *B60S 3/04* | (2006.01) |
| *A47L 1/06* | (2006.01) |
| *A47L 1/15* | (2006.01) |
| *A47L 13/11* | (2006.01) |
| *A47L 13/12* | (2006.01) |

(52) U.S. Cl.
CPC .............. *B60S 3/045* (2013.01); *A47L 1/06* (2013.01); *A47L 1/15* (2013.01); *A47L 13/11* (2013.01); *A47L 13/12* (2013.01); *A46B 2200/3046* (2013.01)

(58) Field of Classification Search
CPC ... A47L 1/06; A47L 1/15; A47L 13/11; A47L 13/12; A46B 2200/3046; B60S 3/045
USPC ....... 15/114, 117, 121, 115, 159.1, 160, 228, 15/244.1; D4/116; D32/40–42, 51, 52, D32/50
See application file for complete search history.

(56) References Cited

U.S. PATENT DOCUMENTS

| | | | | |
|---|---|---|---|---|
| 603,581 A | * | 5/1898 | Urmston ................ | A46B 9/005 15/117 |
| 1,378,243 A | * | 5/1921 | Kracke .................... | A47L 1/09 15/121 |
| 2,080,334 A | * | 5/1937 | Petrovsky ............... | A47L 13/12 15/114 |
| 2,518,765 A | * | 8/1950 | Ecker ...................... | A47L 13/12 15/115 |
| 2,534,086 A | * | 12/1950 | Vosbikian ................ | A47L 1/06 15/115 |
| 2,663,889 A | * | 12/1953 | Fuglie ...................... | A47L 1/06 15/114 |
| 2,893,044 A | * | 7/1959 | Kurose .................... | A47L 1/08 15/114 |
| 3,656,202 A | * | 4/1972 | Paton ...................... | A47L 13/16 15/114 |
| 3,968,535 A | * | 7/1976 | Nichols, Jr. ............. | A47L 23/04 15/105 |
| 4,107,812 A | | 8/1978 | Lantto | |
| 4,392,269 A | * | 7/1983 | Nishiyama ............... | A46B 7/04 15/145 |
| 4,841,854 A | | 6/1989 | Bubley | |

(Continued)

FOREIGN PATENT DOCUMENTS

DE      3834301      * 4/1990

*Primary Examiner* — Mark Spisich
(74) *Attorney, Agent, or Firm* — Kenneth L Tolar

(57) ABSTRACT

A cleaning implement includes an elongated, arcuate shaft having a handle at a proximal end and a cleaning head at a distal end. The cleaning head includes a plurality of juxtaposed, removable attachments, such as a sponge, a scrubbing brush and one or more wiper blades. The shaft is constructed with a resilient but slightly pliable material so that a user can simultaneously force the sponge, brush and blades against a windshield by applying a predetermined amount of force to the handle.

1 Claim, 2 Drawing Sheets

(56) References Cited

U.S. PATENT DOCUMENTS

| | | | |
|---|---|---|---|
| D312,339 S * | 11/1990 | Nero, III | D32/40 |
| D422,765 S * | 4/2000 | Viola | D32/35 |
| 6,092,255 A | 7/2000 | Kim | |
| 6,625,840 B1 | 9/2003 | Hansen et al. | |
| 7,155,771 B2 | 1/2007 | Re | |
| 2008/0163442 A1 * | 7/2008 | Vaartjes | A46B 15/0055 15/117 |

* cited by examiner

WINDSHIELD CLEANING IMPLEMENT

CROSS REFERENCE TO RELATED APPLICATIONS

This application is entitled to the benefit of provisional patent application No. 62/043,003 filed on Aug. 28, 2014, the specification of which is incorporated herein by reference.

BACKGROUND OF THE INVENTION

The present invention relates to an implement that allows a user to dampen, scrub and scrape a windshield with a single swipe.

DESCRIPTION OF THE PRIOR ART

To clean windshield, a vehicle driver or gas-station attendant first applies a cleaning solution to the glass surface to loosen any adhering debris, then scrapes the surface to remove the solution. Various tools exist is in the prior art for applying and removing the cleaning solution. The most common tool, often referred to as a "squeegee," includes an elongated handle having a rubber blade at an end thereof for scraping a windshield. Some squeegees also include a sponge on an opposite side of the handle to facilitate application of cleaning solution. However, because the sponge and blade face opposite directions, a user must first wipe a given area with the saturated sponge to apply the solution, rotate the shaft and then scrape the area with the blade. Repeatedly rotating the shaft and swiping identical areas are laborious and burdensome tasks. Furthermore, conventional squeegees typically include a rigid, linear shaft that prevents the user from properly orienting the sponge or the wiper blade on a windshield.

A review of the prior art reveals a few tools that purportedly facilitate cleaning a windshield or other glass surface. For example, U.S. Pat. No. 4,107,812 issued to Lantto discloses a squeegee having a removable, replaceable blade at an end of an elongated handle. The blade includes a wiper slidably mounted thereon for removing excess moisture.

U.S. Pat. No. 4,841,854 issued to Bubley discloses a screen-printing squeegee having a mechanism for adjusting the stiffness of a wiping blade.

U.S. Pat. No. 6,092,255 issued to Kim discloses a combination scraper, squeegee and sponge wherein the scraper and squeegee blade each include a curved edge adapted to conform to bubble windshields.

U.S. Pat. No. 6,625,840 issued to Hansen et al. discloses a squeegee including an arcuate handle having a blade removably attached to an end thereof.

U.S. Pat. No. 7,155,771 issued to Re discloses an implement including a sponge having a small undercut portion that fits within a seat at an end of a handle.

As indicated above, although a few squeegees with removable blades exist in the prior art, none address the inconvenience of repeatedly rotating a handle in order to apply and then remove a cleaning solution. Though the device of Kim includes a wiper blade and sponge that are arguably on the same side of a shaft, the blade edge is spaced from and lies in a different plane than the sponge. Accordingly, a user must reorient the handle in order to apply either the wiper blade or sponge. Furthermore, the tool includes no means for simultaneously removing more tenacious debris as cleaning solution is being applied and removed. The device only includes an ice scraper on a side opposite the sponge, which requires the user to rotate the handle as described above.

Furthermore, the rigid, arcuate handle of Hansen is merely designed to more comfortably position a user's hand when the blade is applied to a windshield. The short, rigid handle is not designed to flex under pressure to simultaneously force multiple attachments against a windshield.

The present invention overcomes the deficiencies of the prior art by providing a cleaning implement having an elongated, arcuate, flexible shaft with multiple cleaning attachments removably attached to an end thereof. Each of the attachments is secured to the same side of a cleaning head so that a user can dampen, scrub and scrape a surface with a single swipe. Furthermore, the flexible shaft allows a user to force all of the attachments against a windshield by applying pressure to a handle at an opposing end. Finally, one of the removable attachments is a scrubbing brush positioned between a sponge and wiper blade for removing tenacious debris between applying and removing a cleaning solution.

SUMMARY OF THE INVENTION

The present invention relates to a cleaning implement comprising an elongated, arcuate shaft having a handle at a proximal end and a cleaning head at a distal end. The cleaning head includes a plurality of juxtaposed, removable attachments, such as a sponge, a scrubbing brush and one or more wiper blades. The shaft is constructed with a resilient but slightly pliable material so that a user can simultaneously force the sponge, brush and blades against a windshield by applying a predetermined amount of force to the handle.

It is therefore an object of the present invention to provide a windshield cleaning implement that allows a user to simultaneously clean, scrub and scrape a windshield with a single swipe.

It is another object of the present invention to provide an implement having multiple, removable attachments on the same side of a cleaning head to eliminate the laborious practice of repeatedly rotating a handle in order to clean and subsequently scrape a windshield.

It is yet another object of the present invention to provide a windshield cleaning implement having an arcuate, pliable handle that can be flexed slightly to force multiple cleaning attachments against a windshield.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
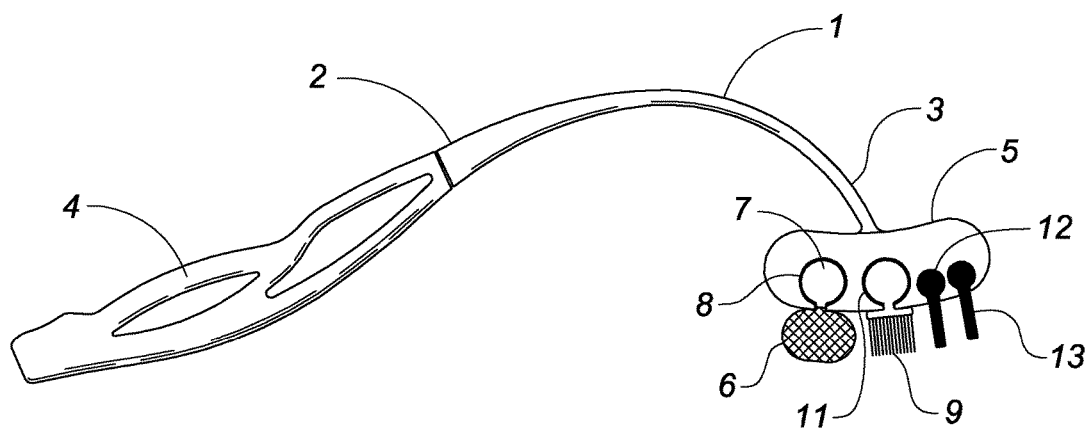
FIG. 1 is a side, plan view of the cleaning implement according to the present invention.
Figure 2:
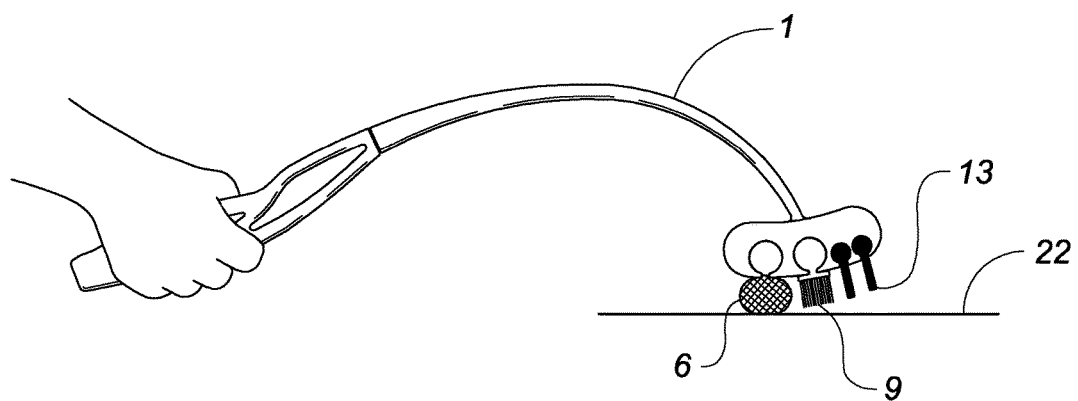
FIG. 2 is a side view of the cleaning implement being applied to a windshield.
Figure 3:
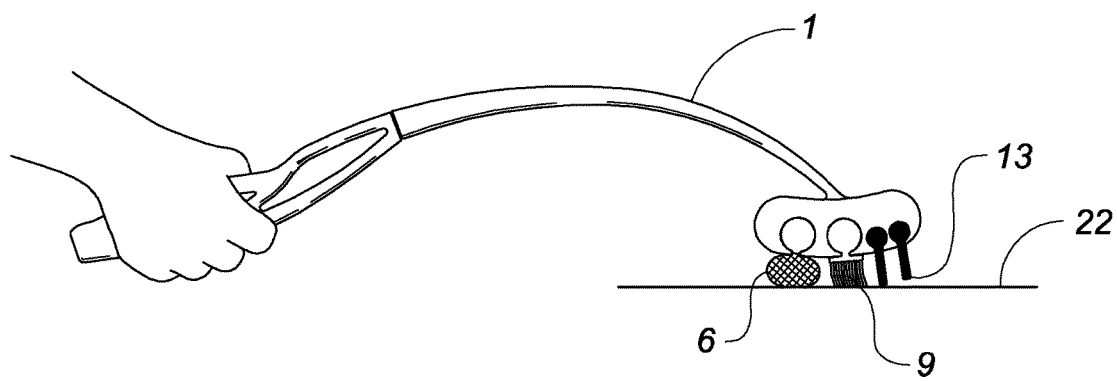
FIG. 3 depicts the cleaning implement of FIG. 2 with a slight force being applied to the shaft to force the brush against the windshield.
Figure 4:
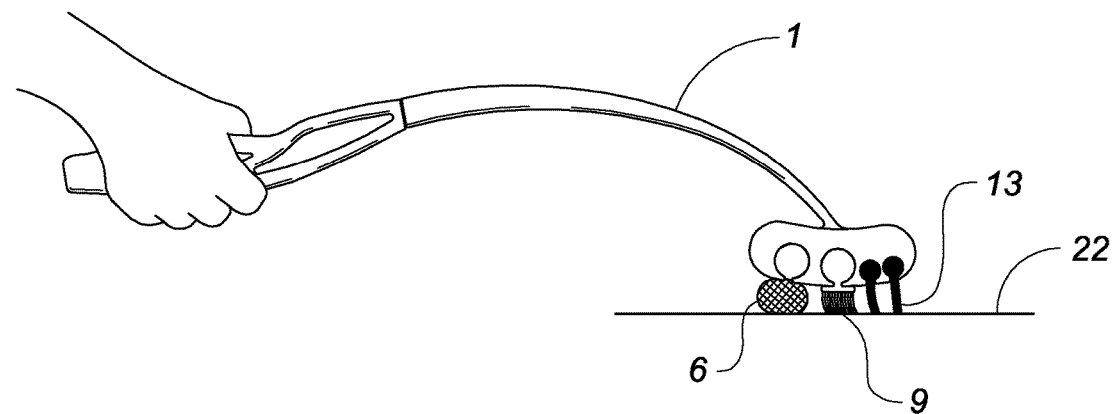
FIG. 4 depicts the cleaning implement of FIGS. 2 and 3 with additional force being applied to the shaft to also position the wiper blades on the windshield.

The present invention relates to a cleaning implement comprising an elongated, arcuate shaft 1 having a proximal end 2 and a distal end 3. Attached to the proximal end is an ergonomic handle 4 having a geometric configuration that can be comfortably grasped by a user. The distal end of the shaft is attached to the rear face of a cleaning head 5 that removably carries a plurality of attachments.

The front face of the cleaning head includes a plurality of juxtaposed, tubular slots extending from one end to an opposing end. A first attachment 6 is an elongated sponge having a longitudinal projection 7 on a lower surface that is dimensioned and configured to firmly slide within a lowermost slot 8. A second attachment 9 is a scrubbing brush having a similar protrusion that slidably mates with an intermediate slot 11. One or more upper slots 12 slidably receive wiper blades 13.

The shaft is constructed with a resilient but slightly pliable material so that it flexes somewhat when pressure is applied to the handle while at least one attachment is engaging a fixed surface. Therefore, a user can force the sponge, brush and blade(s) into simultaneous contact with a windshield 22 by applying a predetermined amount of force to the handle. When pressure is removed, the shaft assumes it original orientation.

To clean a windshield or other glass surface, a user places the cleaning head on the windshield and begins sliding the sponge in a desired direction. As the head is being slid, the user applies additional force to the handle in order to simultaneously force the brush and blades against the windshield. Accordingly, the user can simultaneously dampen, scrub and scrape a given area of a windshield with a single swipe.

The above-described device is not limited to the exact details of construction and enumeration of parts provided herein. Furthermore, the size, shape and materials of construction of the various other components can also be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A windshield cleaning implement comprising:
   an elongated shaft having a proximal end and a distal end, wherein said shaft is elongated, arcuate and constructed with a resilient but flexible material,
   a cleaning head attached to the distal end of said shaft, said cleaning head having a front face and a rear face; said cleaning head including a plurality of juxtaposed, tubular slots on the front face;
   a sponge having a projection that is slidably receivable within one of said tubular slots to removably attach said sponge to the front face of said cleaning head;
   a wiper blade having a projection that is slidably receivable within one of said tubular slots to removably attach said wiper blade to the front face of said cleaning head;
   a scrubbing brush having a projection that is slidably receivable within one of said tubular slots to removably attach said scrubbing brush to the front face of said cleaning head, between said sponge and said wiper blade, whereby a user can simultaneously dampen, scrub and scrape a given area of a windshield with a single swipe;
   a handle at the proximal end of said shaft whereby, when a user applies a predetermined amount of force to the handle, said sponge, said scrubbing brush and said wiper blade are simultaneously forced against a windshield.

\* \* \* \* \*